United States Patent [19]

Xu

[11] Patent Number: 6,018,743
[45] Date of Patent: Jan. 25, 2000

[54] FRAMEWORK FOR OBJECT-ORIENTED INTERFACE TO RECORD FILE DATA

[75] Inventor: Jian J. Xu, San Jose, Calif.

[73] Assignee: International Business Machines Corporation, Armonk, N.Y.

[21] Appl. No.: 08/726,108

[22] Filed: Oct. 4, 1996

[51] Int. Cl.[7] .................................................. G06F 17/30
[52] U.S. Cl. .................................................. 707/103
[58] Field of Search ........................... 707/103, 100, 707/101, 104

[56] References Cited

U.S. PATENT DOCUMENTS

| | | | |
|---|---|---|---|
| 4,930,071 | 5/1990 | Tou et al. ............................ | 364/300 |
| 5,291,583 | 3/1994 | Bapat .................................. | 395/500 |
| 5,295,256 | 3/1994 | Bapat .................................. | 395/500 |
| 5,327,559 | 7/1994 | Priven et al. ...................... | 395/700 |
| 5,414,854 | 5/1995 | Heninger et al. .................. | 395/700 |
| 5,432,925 | 7/1995 | Abraham et al. .................. | 395/500 |
| 5,437,027 | 7/1995 | Bannon et al. .................... | 707/103 |
| 5,475,845 | 12/1995 | Orton et al. ...................... | 395/700 |
| 5,504,892 | 4/1996 | Atsatt et al. ...................... | 707/103 |
| 5,542,078 | 7/1996 | Martel et al. ..................... | 707/101 |
| 5,627,979 | 5/1997 | Chang et al. ..................... | 345/335 |
| 5,692,183 | 11/1997 | Hapner et al. .................... | 395/500 |

*Primary Examiner*—Maria N. Von Buhr
*Attorney, Agent, or Firm*—Gray Cary Ware Freidenrich

[57] ABSTRACT

An object-oriented framework provides an interface for use with object oriented data management systems to provide multiple types of object-oriented data access to record-oriented data files, and can utilize multiple record file adapters to provide OOP applications with access to multiple types of record-oriented data files. The framework thereby permits API programmers to easily create OOP applications that manipulate data in record file data storage. Thus, the framework accesses data stored in record file data structures through a dual two-way interface with persistent object data management services.

26 Claims, 8 Drawing Sheets

PDS_RF
---
checkObjectType( )
connect( )
disconnect( )
store( )
restore( )
delete( )
somInit( )
somUnInit( )

FIG. 8

DSM_RF
---
connect( )
disconnect( )
addObject( )
deleteObject( )
updateObject( )
retrieveObject( )
obj2Rec( )
rec2Obj( )
getSchemaMapper( )
findRFAdpl( )

FIG. 9

FRAMEWORK FOR OBJECT-ORIENTED INTERFACE TO RECORD FILE DATA

BACKGROUND OF THE INVENTION

1. Field of the Invention

The present invention relates generally to manipulation of stored data and, more particularly, to manipulating data in record file data storage systems through object-oriented programming techniques.

2. Description of the Related Art

The dominant method of representing and storing data in computer databases follows a top-down, procedural data model. In the procedural model, systems are represented as a collection of states whose condition at any particular time are represented by data values stored in record-oriented data files. The data values are changed through the operation of an application program. Generally, a user accesses an application program and manipulates the data representing a system through an application program interface (API). The functions performed on the data values by the application program and the record file data structures are matched to a particular data model problem-solution format and are not easily re-used for other application programs.

RECORD-ORIENTED DATA FILES

Record file data generally comprises three types of data file representations: sequential files, relative files (also called direct files), and keyed files. A typical record-oriented file management system will support each of these record file types. Examples of record-oriented file systems are "SFS" by TransX Corporation, "VSAM" by International Business Machines Corporation (IBM Corporation), "Btreive", and "LANDP". Accessing such record-oriented data files typically requires applications programs written in what are generally referred to as procedural computer languages, such as FORTRAN, COBOL, Pascal, C, or assembly language.

Data stored as a sequential file consists of data records (strings of data words) that are recorded sequentially, such as in a magnetic tape drive data storage system. Thus, both data storage and data retrieval must be performed sequentially. Data stored as a relative file consists of data records that are numbered and indexed. Therefore, data in a relative file can be independently accessed; relative files permit random access to particular files. Finally, keyed files are files in which each data record can have one or more key fields. Data records are accessed according to the value of the one or more data keys. Thus, specifying a key value specifies a corresponding data record.

OBJECT-ORIENTED PROGRAMMING (OOP)

Many newer application programs and API's are being developed according to the object-oriented programming (OOP) data model. The OOP data model views complex systems as a collection of interrelated, cooperative objects that are instances of classes that typically include corresponding methods (also called operations or functions). Thus, an object is said to encapsulate class attributes (or data structures) and methods. The number of objects that might exist in a given OOP model is limited only by the size of computer memory.

Another OOP notion is that of inheritance, which refers to the ability of object members in one class, called a subclass, to incorporate the attributes and functions of members in another class, called a superclass. In this way, object procedures specified by a class definition can be reused again and again by object instances of the class at the time the program executes.

An inherited method in a subclass object generally can be changed in one of two ways. First, a method override can occur when the program code for functioning of a method is replaced by alternative code from the subclass. A second way of changing a method occurs with a method extension, when the program code from the superclass is retained, but program code from the subclass is added to perform additional functions. Other OOP advantages are simpler program coding, easier program maintenance, reduced complexity of the system model, increased program reuse, and the ability to specify a framework of reusable definitions for classes of objects.

The concept of a framework is a vital part of the OOP data model that provides the advantages desired by OO programmers: a framework is a specification of the classes and the relationships between classes of an OOP data model. That is, a framework comprises a class hierarchy that can be used over and over again, with overrides and extensions. In this way, an initial problem solution specified by a class hierarchy can be adapted and customized for new circumstances, simplifying program maintenance. Common OOP languages in which object applications are written include Simula, Smalltalk, and C++.

Communication between OOP applications developed by different programmers is being facilitated by the work of the Object Management Group (OMG), an industry consortium. One standard of program-to-program communication, for example, is specified by the Common Object Request Broker (CORBA) standard promulgated by OMG.

It should be understood that data created by and for object-oriented programs is stored differently from data created by and for record-oriented data files. Data stored for object-oriented programs do not necessarily correspond to the record format types of sequential, relative, and keyed, due to the different nature of the system model and the manner in which data is stored. Thus, record file database systems such as "SFS", "VSAM", "Btreive", and "LANDP" referred to above are not generally compatible with object-oriented programming data.

The concepts of OOP do not easily lend themselves to interface with conventional record file database programming using the procedural model. As noted above, a hallmark of the procedural model is the representation of a system as a collection of data values that are maintained in a datastore, such as magnetic disk storage or memory. This quality of static data storage is referred to data persistence.

In the OOP data model, the attributes of an object are allocated memory space only for so long as the corresponding object is needed. When the object is no longer needed, it is deleted from memory. In this way, object methods are implemented at the time of execution by message passing from object to object at run time. This is generally referred to as dynamic binding. Object methods are therefore said to be polymorphic, because they can assume different implementations at different points in an executing program. Thus, OOP data is not generally persistent because it does not exist after a programming session of an OOP application ends.

Object data that is to persist from session to session can be stored directly as objects in an OOP database or can be converted to record data storage. An object that is stored as record data must be retrieved and then converted back into object representation before being used in an OOP application. In an OOP database, the condition of objects is stored, comprising the value of the object attributes and the operation of the methods. An object retrieved from an OOP database can immediately be used in an executing OOP application.

THE RECORD DATA FILE-OOP INTERFACE

Users of OOP application programs want to be able to access record-oriented data. Users of such programs do not want to be bothered with the OO-to-record interface problem. As a result, API developers, who create application programs, want to utilize programming interfaces that make the OO-to-record data interface as transparent as possible for their own development efforts and certainly for end users of their application programs.

The data access interface to persistent data from the perspective of API programmers is generally classified at one of four levels. Level 1 access is provided where persistent data is stored and retrieved from OOP applications directly as objects. Level 2 access is provided where persistent data is stored as record data and the record-oriented nature of data is apparent to an API programmer, in that record store and retrieve operations are used to access data maintained on the datastore. Level 2 access would be provided, for example, by a data access product that complies with the Persistent Object Service (POS) standard specified by the OMG. Level 3 access is provided where procedural programming, record data commands are translated to corresponding object-oriented commands, thereby comprising what is called an OO "wrapper". For example, the IBM Corporation "Common Object Datastore Adapter" (CODA) project translates record-oriented "x/open" commands to corresponding OO commands and thereby provides Level 3 access. Finally, Level 4 access is generally provided where a data access product relies on OO language libraries for data access such that the record data nature of underlying data is readily apparent to the API programmer.

A variety of OOP data file management systems have been developed. One system, for example, is based on a generalized object data model from IBM Corporation called the "Standard Object Model" (SOM) and the corresponding data access file management system is called "Persistent Object Service for SOM" (POSSOM). The POSSOM system makes use of an IBM Corporation data class hierarchy (a framework) called the "Persistent Object Framework" (POF). The POSSOM system provides an interface that can be used by API program developers to create object-oriented applications that utilize store and retrieve operations to access persistent object data maintained on disk storage. The POSSOM system thus provides Level 2 access.

The framework on which POSSOM is based defines two interfaces. The first interface is a client code interface that describes how clients request persistent operations on objects regardless of underlying datastore. The client code interface is implemented through a "Persistent Object Manager" (POM) that permits persistent objects to implement persistence independently of the datastore. The second interface is a datastore interface that describes how a datastore provider "plugs" a new datastore into the POSSOM system. The datastore interface is commonly referred to as the "Abstract Persistent Data Service" (PDS). In particular, the POSSOM system provides a PDS interface to byte stream files of the type specified by the operating system standard known as Portable Operating System Interface (POSIX).

In accordance with the generally accepted OOP model, any datastore object that can be implemented as a specialization of the PDS is assured of being compatible with the POSSOM system. Such datastores can be used as repositories for any object that implements persistence through the POM interface, regardless of whether that object makes its persistence visible through the Persistent Object interface. That is, PDS-compatible datastores can be used as repositories for any object that implements persistence through the POM interface, regardless of whether that object implements persistence through the POM interface. The Level 2 access through the Persistent Data Service (PDS) of POSSOM permits storage and retrieval of data from objects by establishing a protocol. PDS preferably recognizes multiple types of protocols, including a "byte stream" protocol.

The "Common Object Datastore Adapter" (CODA) from IBM Corporation is tailored for use with record data file systems such as the "DB2" and "IMS" systems from IBM Corporation to provide Level 3 access. The CODA system provides an API programmer with access to record-oriented data using such DB2 commands as "fetch" and "carry". The CODA system provides an object-oriented API to databases such as created using the "DB2" and "IMS" products of IBM Corporation. The CODA system provides the access by using a "Dynamic Data Object" (DDO) to contact a "Data Store Manager" (DSM) module. One desirable feature of the CODA system is that it is protocol independent. Another interface that provides access of the Level 3 type is the "Taligent Data Access Framework" from Taligent Corporation.

Development of application programs that can interface record-oriented data files to multiple object-oriented access levels is complicated by the generally incompatible Level 2 and Level 3 interfaces. That is, an application programmer who wants to develop an application that can access data through both POSSOM and CODA might be required to write two different applications because POSSOM and CODA utilize different protocol schemes and class hierarchies to define their respective object classes and methods. Alternatively, an API programmer would be required to provide two API environments to accommodate the different access levels of service. In both cases, multiple programs also might be needed to deal with the different types of record storage. Such duplicative efforts are wasteful of programming resources and result in extra costs.

From the discussion above, it should be apparent that there is a need for a system that permits data access between multiple record-oriented data file systems and multiple object-oriented file management systems across different protocol types. The present invention satisfies this need.

SUMMARY OF THE INVENTION

In accordance with the invention, a two-way object-oriented framework provides an interface that can be plugged into multiple OOP-to-record file data management systems to provide multiple types of object-oriented application programs with access to record-oriented data files, and can receive multiple record file adapters to provide OOP applications with access to multiple types of record-oriented data files. The present invention thereby provides a method and apparatus that permits API programmers to easily create OOP applications that manipulate data in record file data storage. In particular, the invention provides an object framework used by a persistent object data manager to access data stored in a record file data structure. In this way, the present invention provides a uniform interface to permit OOP applications with the ability to store, retrieve, and delete data stored in record file data storage. By defining specialized objects, the framework can interface with a variety of OOP data managers and formats, such as those called POSSOM and CODA, and also can interface to a variety of record file data systems, such as those called SFS, VSAM, DB/2, LANDP, and Btreive. In this way, the present invention provides a system that permits data access between multiple record-oriented data file systems and multiple object-oriented file management systems across different protocol types, thereby assisting API program developers with the creation and maintenance of object-oriented application programs that can interface with record-oriented datastores.

In one aspect of the invention, the framework includes five object classes that provide: (1) a persistent identifier of the access path for persistent object data storage, including specification of a datastore name, data identifier, and schema mapper; (2) a persistent data service object abstraction that will interface with an existing persistent data service and that will support multiple data protocols; (3) a datastore manager that manages the record file datastores; (4) a schema mapper that permits an API programmer to specify the mapping between object data and the record file data; and (5) a record file adapter that provides a mapping between the datastore manager and the various procedural, record-oriented file systems.

Using the five object classes described above, a framework constructed in accordance with the present invention can instantiate various objects to permit specialization of features. In this way, a system that implements a framework in accordance with the invention can support an OOP interface to streammable data objects and can map object data to VSAM/X record-oriented file systems.

In another aspect of the invention, a framework implemented in accordance with the present invention permits both Level 2 and Level 3 access to record-oriented data file systems through POSSOM and CODA systems, respectively.

Other features and advantages of the present invention should be apparent from the following description of the preferred embodiment, which illustrates, by way of example, the principles of the invention.

BRIEF DESCRIPTION OF THE DRAWINGS

FIG. 8 is a class diagram representation of the PDS_RF category implemented by the computer processing system illustrated in FIG. 1, showing the method names.

FIG. 9 is a class diagram representation of the DSM_RF category implemented by the computer processing system illustrated in FIG. 1, showing the method names.

DESCRIPTION OF THE PREFERRED EMBODIMENT

Figure 1:
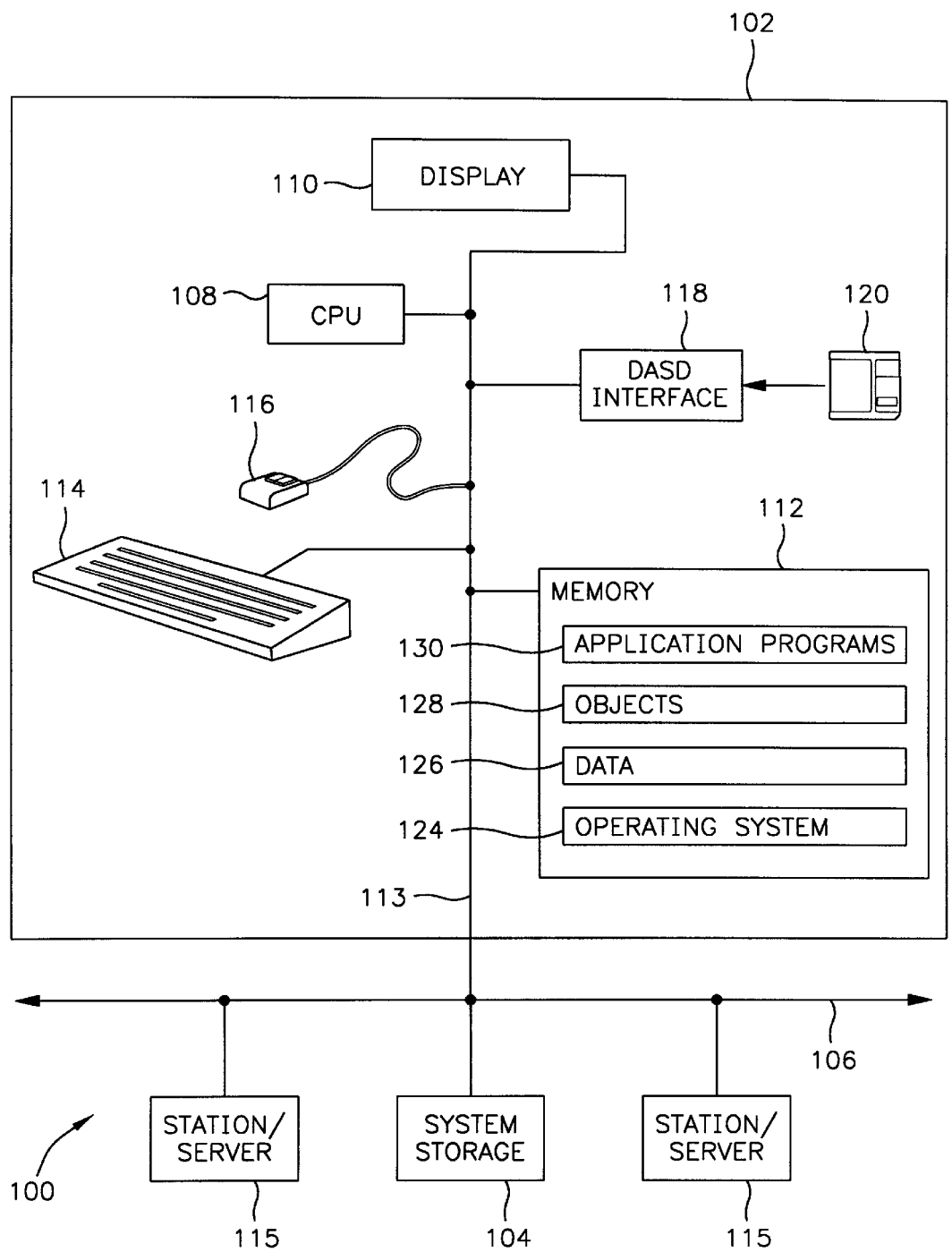
FIG. 1 is a functional block diagram of a computer system constructed in accordance with the present invention.

The preferred embodiment of the present invention comprises a framework that, when implemented in an object-oriented programming environment, provides a data access service for persistent object data associated with record file datastores. For ease of reference, the framework will be referred to by the name "POS_RF". The POS_RF framework is designed to interface with multiple object data services to provide multiple-level data access. In this way, the POS_RF framework provides a mapping between persistent object data and record file data. In addition, the framework has the flexibility to support multiple data protocols. The POS_RF framework can be used by a developer of an API that will comprise an object-oriented application program that must interface with record file data. In this way, the object-to-record interface will be completely transparent to users of the application program, who will be able to access record file data from the object-oriented user interface.

The POS_RF framework consists of five object classes, described further below, that provide essential functions including persistent object identification, persistent data service in connection with Level 2 access, datastore management in connection with Level 3 access, schema mapping, and record file adapters that provide a mapping from a datastore management object and the record file systems with which data transfer will be accomplished. With objects comprising appropriate class extensions that depend on the precise programming environment confronted by the framework developer, the POS_RF framework provides a two-way object-oriented framework that can be plugged into multiple OOP-to-record file data management systems to provide object-oriented application programs with Level 2 and Level 3 access to record-oriented data files, and that can receive multiple record file adapters to provide OOP applications with access to multiple types of record-oriented data files. Thus, the invention provides a single interface that accommodates multiple OOP platforms and thereby permits API programmers to easily create OOP applications that manipulate data in record file data storage.

HARDWARE BLOCK DIAGRAM

The POS_RF framework is implemented and executed on a computer system that supports an object-oriented programming environment such as exemplified by programs written in the C++ language. In the preferred embodiment, the POS_RF framework receives client commands from a Level 2 access system such as POSSOM to manipulate record file data and also receives data manipulation commands from a Level 3 access system such as CODA. The POS_RF framework provides the persistent object service (POS) defined by the Object Management Group (OMG) standard, thereby providing a uniform interface to store, restore, and delete persistent object data in and from record file datastores. Thus, the POS_RF framework solves the problem of mapping between client object data and system record file data. The POS_RF framework is compatible with the Persistent Object Framework (POF), so that it can interface with Level 2 and Level 3 access systems, and also can receive multiple record file system adapters to provide an interface to corresponding record file datastore systems.

FIG. 1 is a block diagram of a computer system 100 constructed in accordance with the present invention. The computer system illustrated in FIG. 1 supports an object-oriented programming environment suitable for the POS_RF framework and includes a client station 102 that communicates with system storage datastore 104 over a network 106. The system storage datastore 104 can comprise, for example, a direct access storage device (DASD) such as magnetic disk drive, magneto-optical storage, or magnetic tape storage, or can comprise a collection of linked DASD units comprising a magnetic disk drive storage array or the like.

A user at the client station 102 carries out data operations that generate or utilize object data and can specify data access operations (such as store, retrieve, delete) on record file data contained in the system storage datastore 104. Alternatively, the datastore operations can be performed on record file data contained at the client station 102 in storage described further below. The client station 102 also can be used to specify the appropriate extensions to the POS_RF framework to thereby generate appropriate instances of objects to provide the desired interface.

The client station 102 includes a central processing unit (CPU) 108, a display 110, and a main memory 112. Processing operations are executed under control of the CPU, which communicates with the network 106 and other client station components over a system bus 113. The CPU operates in response to user commands, which it receives via a keyboard 114 or a graphical interface input device 116, such as a display mouse, joystick, or track ball. As noted above, the POS_RF framework permits the API programmer, who generates applications that manipulate data, to provide a transparent OO-record data interface to application users. Accordingly, a user at the client station 102 can be either a POS_RF framework user or an application program user. The client station 102 can communicate with one or more other client stations or network server units 115 over the network 106. It should be understood that the other network stations or servers 115 have a construction similar to the client station 102. Those skilled in the art will appreciate that a server 115 typically controls access to system datastore, such as the system storage 104 depicted in FIG. 1.

The client station 102 also includes a DASD interface 118 that can receive and read computer program products 120 comprising machine-readable storage devices such as, for example, integrated circuit chips or magnetic media disks or tapes, on which are recorded program instructions or data. The machine-readable storage devices also can comprise, for example, media such as optical disks. The client station 102 also communicates with other stations, servers, or mainframe computers over the network 106. This permits the client station 102 to receive data into the main memory 112 over the network 106 after network communication has been established using well-known methods that will be understood by those skilled in the art without further explanation.

When properly extended by an API developer, the POS_RF framework provides an object-oriented interface between the client station 102 and data contained in the system datastore 104. The extended POS_RF framework can be maintained at a network server 115 or can be maintained at the client station 102. Copies of the extended POS_RF framework can be provided to users from a server 115 by means of network access methods or can be provided by copying onto instruction-bearing media computer program products, such as floppy disks 120.

The main memory 112 contains a variety of data structures and information, including an operating system 124, data 126, objects 128, and application programs 130. The main memory is represented as a single entity, but those skilled in the art will appreciate that the main memory can comprise a combination of random access memory (RAM), hard disk drives, optical disk drives, and other storage devices containing logically segmented storage locations. One of the application programs in the main memory 112 of the client station 102 is a POS_RF application program containing a sequence of program instructions whose execution implements the present invention.

The operating system contained in the main memory 112 supports an object-oriented programming environment for the execution of object-oriented programs, such as those written in, for example, the C++ programming language. Accordingly, the memory contains program objects that are data structures of an object-oriented programming language. Application programs are invoked, or launched, by a user interface action through the keyboard 114 or graphical input device 116. The application programs can be written in a variety of languages, including C++.

The CPU 108 can comprise any one of many platforms, including the International Business Machines Corporation (IBM Corporation) Model PS/2® personal computer, IBM Corporation Model RS/6000 workstation, and the like. In the preferred embodiment, the graphical input device 116 comprises a display mouse, but it can be substituted with other devices that provide the same function and control, such as a track ball or joystick, which are well-known to those skilled in the art and require no further explanation. Thus, references to the display mouse will be understood to include alternative devices such as track ball and joystick controllers. Likewise, references to mouse buttons and other mouse features will be understood to include equivalent mechanisms for track balls, joystick devices, and the like.

The display 110 comprises a display device such as a video terminal that displays computer output and indicates system operations. Display objects can be pictured on the display and the user can designate data operations on the display by using the graphical user input device 116.

THE POS_RF INTERFACE BETWEEN CLIENT PROGRAMS AND RECORD DATA FILES

Figure 2:
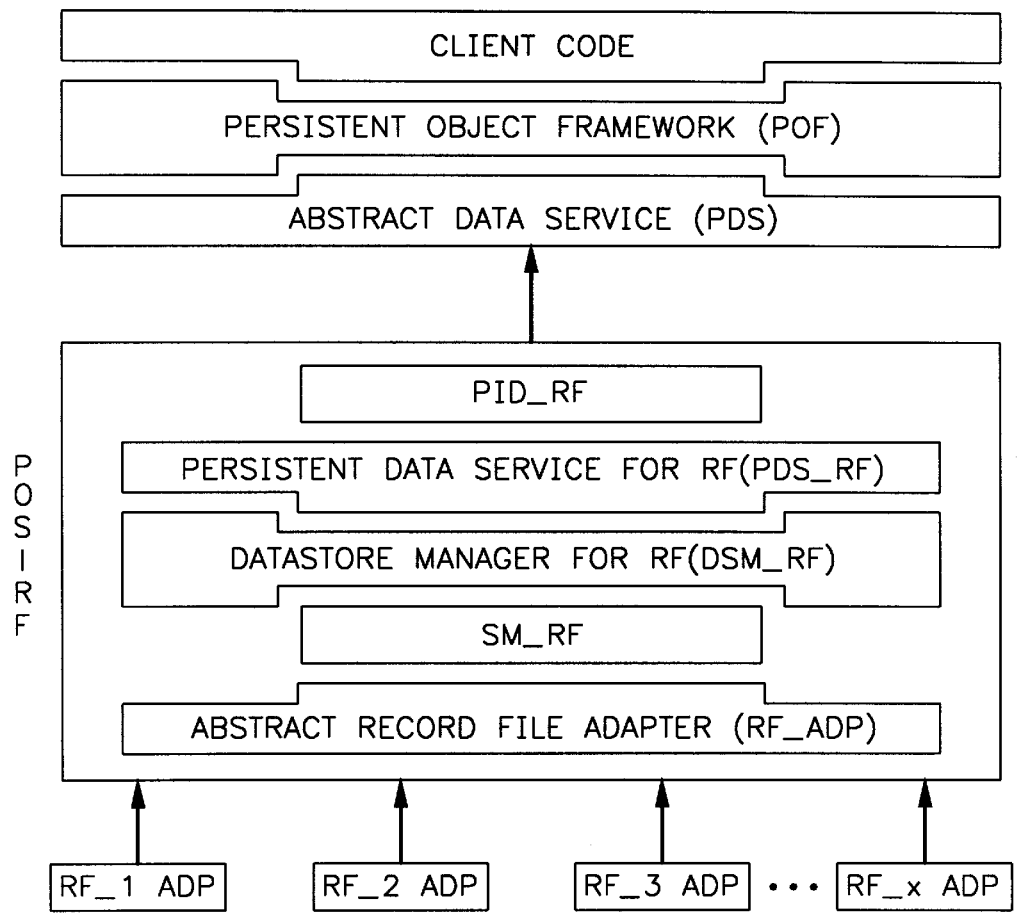
FIG. 2 is a functional block diagram of the POS_RF framework components showing how the two-way interface of the framework to both the Persistent Object Framework (POF) and record file data adapters.

FIG. 2 shows how the POS_RF framework communicates with both the Persistent Object Framework (POF) of client application programs and record file data contained in system datastores. FIG. 2 is a block diagram representation of the object classes of the POS_RF framework that illustrates the flow of control and communications between the five object classes of POS_RF mentioned above.

FIG. 2 shows that client code, comprising an object-oriented application program that is used to manipulate record file data, interfaces with programming that is structured in accordance with the Persistent Object Framework (POF), which in turn interfaces with an Abstract Persistent Object Data Service (PDS) that ordinarily provides a data interface of either a Level 2 or Level 3 access type. The POS_RF programming interface to the client code presents itself at the PDS with a block labelled PID_RF, which represents an operating component of the POS_RF extended framework that is specialized to interface to record file datastores.

Within POS_RF, the PID_RF component interfaces with a component block shown in FIG. 2 labelled Persistent Data Service for Record Files (PDS_RF), which in turn interfaces with a component called Datastore Manager for RF (DSM_RF). The DSM_RF must interface with another component, SM_RF, that specifies schema mapping between object data and record data via appropriate record file adapters. The Abstract Record File Adapter (RF_ADP) is an abstract class "wrapper" that provides a mapping between the DSM_RF and various procedural record-oriented data file systems. Finally, FIG. 2 shows RF_ADP communicating with multiple record file adapters to provide adapters specialized for particular record file systems. The multiple record file adapters of FIG. 2 are generically labelled RF_1_ADP, RF_2_ADP, RF_3_ADP, . . . , RF_X_ADP.

THE POS_RF INTERFACE WITH EXISTING OBJECT DATA ACCESS SERVICES

As noted above, the POS_RF framework implements the Persistent Object Service (POS) specified by the OMG standard, and is designed to interface with multiple data access services to provide multiple-level data access. For example, in the preferred embodiment the extended POS_RF framework interfaces with (can be plugged into) the Level 2 data access service called Persistent Object Service for the System Object Model (POSSOM) and also interfaces with the Level 3 data access service called Common Object Datastore Adapter (CODA). The POS_RF framework is designed for implementation on multiple platforms using the SOM Interface Definition Language (IDL) and language binding with the C or C++ programming languages.

Figure 3:
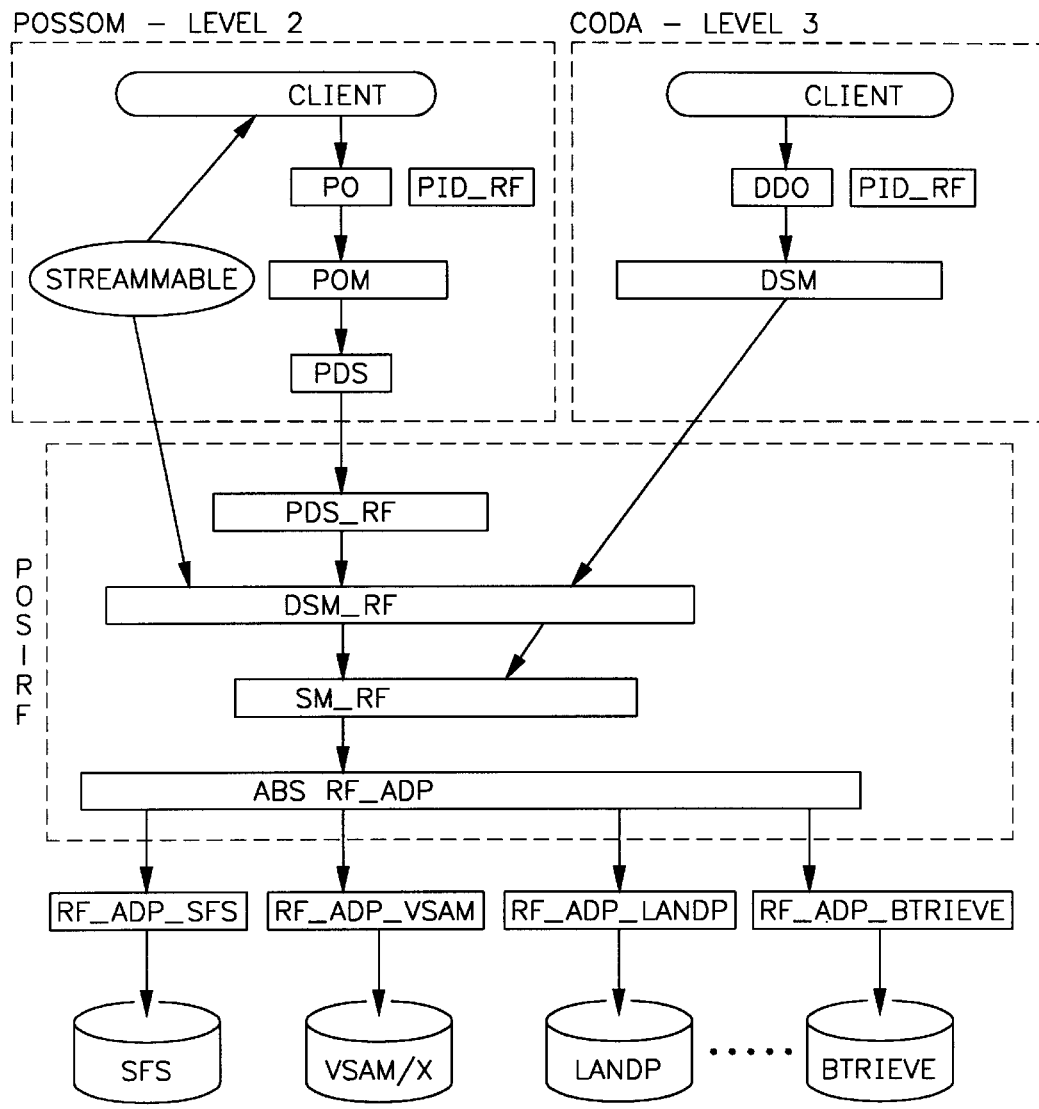
FIG. 3 is a functional block diagram of the POS_RF framework components showing how the components interface with existing persistent data service systems, such as POSSOM and CODA.

FIG. 3 is a functional block diagram of the POS_RF framework components showing how the components interface with existing persistent data service systems, such as POSSOM and CODA. That is, FIG. 3 is a representation of the interface between POS_RF and the POSSOM and CODA systems. Conventionally, data access services provide only Level 2 access (such as POSSOM) or provide only Level 3 access (such as CODA). Therefore, the present invention permits interfacing to both POSSOM and CODA projects without duplicate programming efforts.

POSSOM Data Services and the POS_RF Framework

FIG. 3 shows that the POSSOM object-oriented data service receives requests for record data access from a client interface (labelled "Client") at a module called Persistent Object (PO), which then communicates with a POSSOM module called Persistent Object Module (POM). The POM interfaces with a Persistent Data Service (PDS) module, which then actually communicates with a record file datastore. When the POS_RF framework is plugged into POSSOM, the client interface with POS_RF is through the PDS_RF module. That is, POS_RF receives a Level 2 request for record data at the PDS_RF module. The request is processed and is passed on to the DSM_RF module, from there to the SM_RF module, and then through the RF_ADP modules to the record datastore. FIG. 3 also shows that requests for "streammable" data can be received by the DSM_RF directly from the POSSOM client.

CODA Data Services and the POS_RF Framework

FIG. 3 shows that the CODA object-oriented data service receives requests for record data access from a client interface (labelled "Client") at a module called Dynamic Data Object (DDO), which then communicates with a CODA module called Datastore Manager (DSM). The DSM of CODA interfaces with the POS_RF DSM, which then communicates with the POS_RF modules SM_RF and RF_ADP and then finally to the actual record file datastore. Thus, when POS_RF is plugged into CODA, the client interface with POS_RF is through the DSM_RF module. That is, POS_RF receives a Level 3 request for record data at the DSM_RF module.

PID_RF Functioning of POS_RF

The POS_RF framework supports multiple OO access levels primarily through the DSM_RF component, which functions as a datastore manager for record files. In the preferred embodiment, for example, a client (user application) achieves Level 2 access by using the POS standard operations that are associated with the client persistent object data, as defined by the POS standard of the OMG, to access record data. The Level 2 interface between the POS_RF framework and the data interface specification (the interface specified by the POF standard) is through the PDS_RF. The PDS_RF interacts with the DSM_RF to access the record data files. A client achieves Level 3 access by using an OO wrapper on top of an "X/Open" CLI equivalent operation of CODA. That is, the interface between POS_RF and CODA is through the DSM_RF, which comprises the wrapper on top of the RF_ADP. The DSM_RF is specialized to support particular DDO protocol types.

Object Data-to-Record Data File Mapping

The POS_RF framework maps object data and records by defining the access path to record-oriented data maintained in the datastore, and translates the data format between the object data programs and the record data. The POS_RF framework uses the persistent identification PID_RF object class illustrated in FIG. 3 to define the access path of the persistent data and uses the SM_RF object class to do the mapping between the object data and the record file data.

POS_RF defines the access path of persistent OO data using the PID_RF object, based on the assumption that each persistent object has a unique path identification (pathname) and the assumption that each persistent object is mapped to a single data record. In particular, the PID_RF is a subclass of PID_DS, an object class of a persistent data service such as POF. For example, instructions to implement the PID_RF definition (without implementation details) might be represented by the pseudocode of Table 1 below:

TABLE 1

```
#include    <pid_DS.idl>
#include    <rf_defs.idl>
interface xxxPID_RF: xxxPID_DS{
    attribute string           datastoreName;
    attribute boolean          datastoreNew;
    attribute unsigned long    connect_id;
```

TABLE 1-continued

```
    attribute xxxdataId_t    *data_id;
    attribute string         sm_mapper;
};
```

The file is identified by the datastoreName (file name) or by the connect_id. If the datastoreName is not set in the PID_RF module, then it is assumed by POS_RF that the file is open and connect_id is the file handle. Otherwise, the file will be opened and the connect_id will be set by the PDS_RF module. The client can get the connect_id as an attribute of PID_RF and use it for other objects in the same file. Those skilled in the art will appreciate that the connect_id is available to the client for the purpose of reducing application programming efforts and the overhead associated with file open and close operations.

In the Table 1 pseudocode, the attribute dataNew gives the option of creating a new datastore. If the value of datastoreNew is set to "true", then POS_RF will expect that the information for file creation is given in the schema mapper. The name "sm_mapper" identifies the specialized SM_RF module for the application. The "data_id" entry in Table 1 identifies the position of a record in a file. The data_id is a union data structure formed by combining a record number or key defined by the data_id type. The data_id also has flags that allow optional information to be associated with the PID_RF module.

The POS_RF Schema Mapper

The schema mapper SM_RF module provides a mapping between the object data protocol and the record datastores and also creates a new record file datastore by specifying a record and a key format. Thus, the mapping is dependent on a protocol, while the new record creation is protocol independent. The interface definition of the SM_RF module, Instructions to implement the SM_RF interface definition (without implementation details) might be represented by the pseudocode of Table 2 below:

TABLE 2

```
#include <somobj.idl>
#include <rf_defs.idl>
interface    xxxPID_RF;
interface    xxxSM_RF : SOMObject {
    attribute    xxxFileSpec_t *dsSpec;
    void         create_ds();
    xxxFileSpec_t *set_fSpec(in xxxFileType_t fileType,
                 in unsigned long numFields,
                 in xxxFieldSpec_t *fieldArrayP);
    void set_fSpec_field(in xxxFieldSpec_t *fieldArrayP,
                 in long            index,
                 in string          name,
                 in unsigned long   size,
                 in xxxKeyType_t    keyOp);
    char *proto2rec(in SOMObject    protocol,
                 in xxxPID_RF       pid;
                 out unsigned long  recLen);
    SOMObject rec2proto(in char     *rec,
                 in unsigned long   recLen,
                 in xxxPID_RF       pid;
    }
```

In Table 2, the proto2rec() and the rec2proto() methods are defined to transfer data between the protocol and the record datastore, as shown in FIG. 3. The operation of POS_RF assumes that the underlying record file system does not have the record field support. Such record file systems include VSAM/MVS, VSAM/X, VSAM/2, and CICS FC, provided by IBM Corporation. Thus, how actual data is arranged in a record is based on what is known by an application. The two operations need to be overridden by the application during extension of the framework. The POS_RF system provides sample code to guide the application in overriding.

Figure 4:
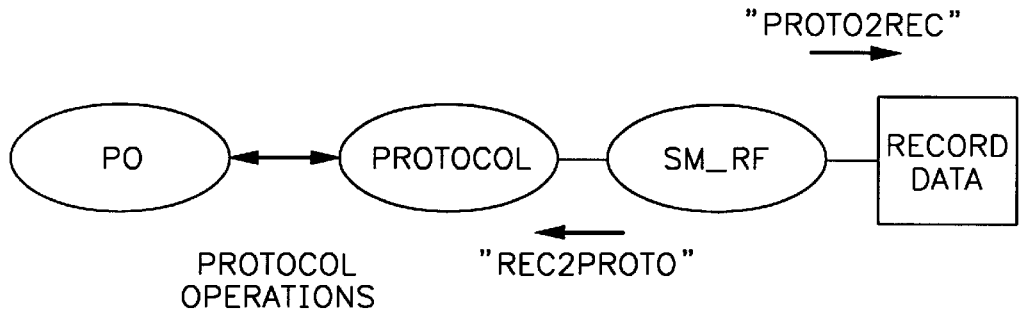
FIG. 4 is a representation of the mapping that occurs between a protocol defined by the schema mapping and the record data files.

FIG. 4 is a representation of the mapping that occurs between a protocol defined by the SM_RF schema mapping module and the record data files. An object attribute dsSpec and an operation create_ds() are used to specify the file type, record data format, and other information needed for file creation. The SM_RF module is used by the DSM_RF module to implement persistent operations. When the SM_RF is specialized, or extended, by an application, the name of the dsSpec object is an attribute of the PID_RF module. The DSM_RF can instantiate the schema mapper SM_RF by getting the module name from the PID_RF, then transfer the data between the protocol and the record data. Thus, getting and putting data from and into the object is achieved through the protocol supported by the persistent object.

The difference between the SM_RF object and the schema mapper in the PDS used by the DB/2 system for direct access is the separation of data mapping from data accessing. That is, the DB/2 schema mapper handles both the data mapping and the SQL accessing. The SM_RF of the POS_RF system handles the data format mapping, but not the data accessing. In this way, schema mapping concerns are isolated from PDS data accessing concerns, thereby permitting reuse of the data accessing code for general purposes.

Protocol-Dependent Mapping

One advantage of object-oriented programming over procedural programming is the encapsulation of code (programming instructions) and data. The subtyping technique used in the POS_RF framework permits reduced development time and effort for protocol issues. By subtyping PDS_RF, DSM_RF, and SM_RF, specialized subclasses for a specific protocol can be derived. These protocol subclasses can be characterized, for example, as PDS_xxx_RF, DSM_xxx_RF, and SM_xxx_RF, where the "xxx" is the name of the protocol. With such specializations, only the operations dealing with data transfer need to be overridden. The protocol independent portion of DSM_RF and SM_RF, such as operations related to files, can be reused. These operations would include open, close, and create operations.

FIG. 3 shows how POS_RF is constructed to handle different protocols, where "STRM" represents the IBM Corporation "Streammable" protocol and "DDO" represents the DDO protocol discussed above. Thus, the POS_RF framework encapsulates the implementation of the RF_ADP and its specialization from the implementation of protocol dependent code. By defining the abstract RF_ADP, the implementation of a specialized adapter, such as RF_ADP_VSAM for VSAM files, can be developed without being effected by the protocol. Because approximately three-fourths of the code is at the record data adapter level, the development effort to support any new protocol should be relatively little.

PROCEDURAL FLOW DESCRIPTION OF POS_RF FUNCTIONING

Figure 5:
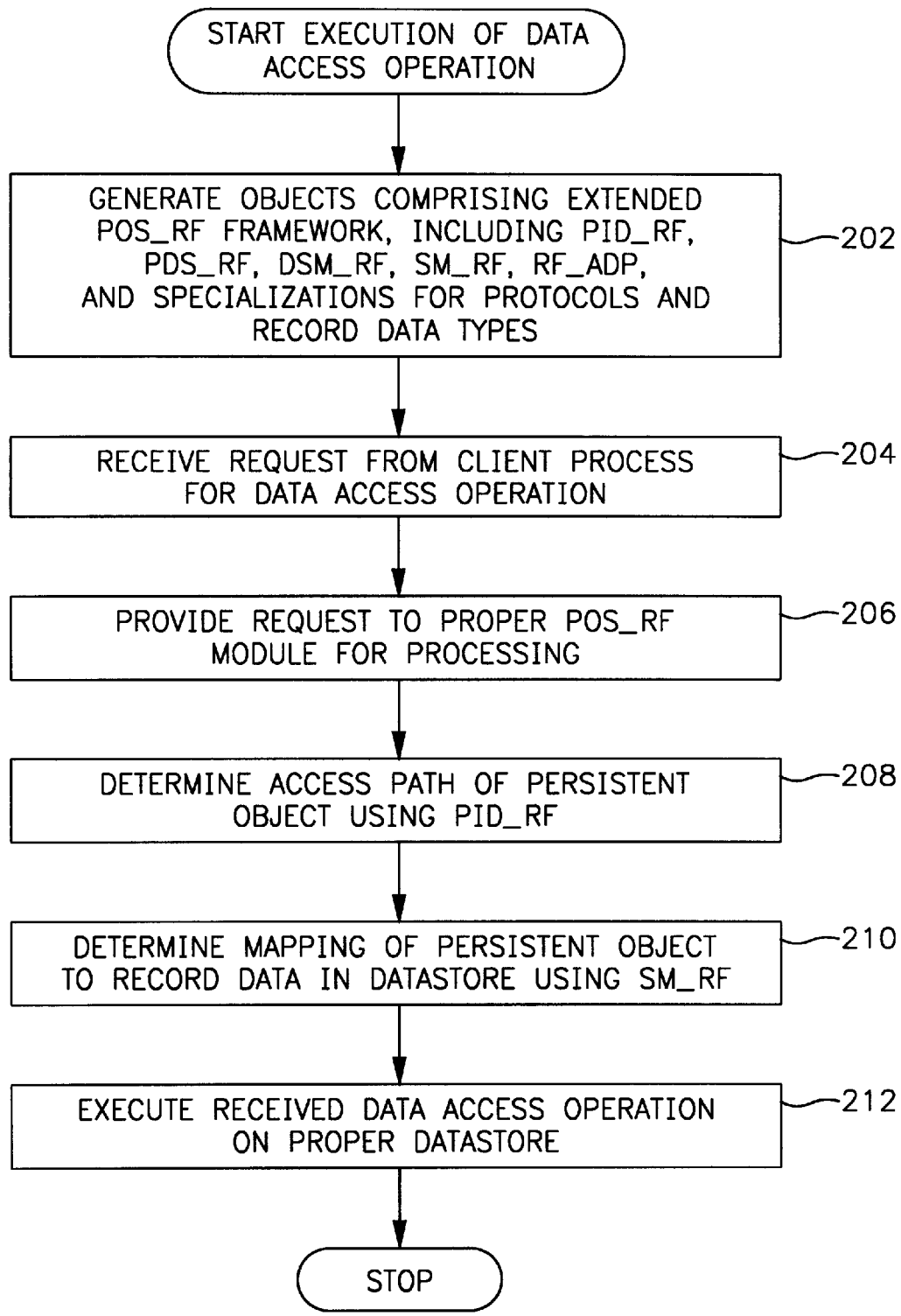
FIG. 5 is a flow diagram that illustrates the processing steps performed by the framework of the computer processing system illustrated in FIG. 1.

FIG. 5 is a flow diagram that illustrates the processing steps performed by the extended framework of the computer processing system illustrated in FIG. 1. Details of extending the framework to achieve the desired processing will depend on the programming environment within the computer system in which the framework extension will be executed, such as the system illustrated in FIG. 1. Such details will be understood by those skilled in the art, in view of the description and drawings herein, without further explanation. The processing steps illustrated in FIG. 5 represent programming instructions executed by the FIG. 1 computer system under control of the CPU 108, in accordance with well-known object oriented programming principles.

The first processing step illustrated in FIG. 5, indicated by the flow diagram box numbered 202, represents the generation of the necessary extended framework objects that comprise POS_RF, including the above-described processing objects called PID_RF, PDS_RF, DSM_RF, SM_RF, and the family of RF_ADP objects. The processing of this step 202 also includes generation of specializations for particular protocols and record data types. For example, it might be necessary to generate a group of PDS_STRM_RF and DSM_STRM_RF objects to handle streamable protocols, and it might be necessary to generate PDS_DDO_RF and DSM_DDO_RF objects to handle DDO protocol data records. Similarly, it might be necessary to generate a RF_ADP_VSAM record file adapter object to map DSM_RF to the IBM Corporation VSAM/X record file system. Such object creation processing is included in the processing of the box numbered 202.

The processing illustrated by the flow diagram box numbered 204 represents receiving a request from a client process for a data access operation. The request might comprise, for example, a user at a user station 102 shown in FIG. 1 requesting storage or retrieval of a persistent data object defined by a user station object-oriented application. The next processing step, represented by the flow diagram box numbered 206, is to provide the request to the appropriate POS_RF module for further processing. That is, using object oriented programming techniques, the computer system CPU ensures that the client data access request is received by the proper POS_RF module. For example, Level 2 requests received from a POSSOM system are routed to the PDS_RF module, while Level 3 requests received from a CODA system are routed directly to the DSM_RF module.

The next processing step involves determining the access path of a persistent object of the client, using the PID_RF object. This processing is represented by the flow diagram box numbered 208. Next, the processing represented by the flow diagram box numbered 210 indicates that a mapping of the persistent object to the record data stored in the system datastore is determined, using the SM_RF schema mapping object. In this step, the storage location of the record file in the datastore is matched to the persistent object referenced by the client process. Finally, the last data access processing step is represented by the flow diagram box numbered 212, which indicates that the data access operation received from the client is executed. The data access operation can comprise any data operation permitted by the data service through which the user interfaces with POS_RF, such as operations passed from the client to the persistent data service such as POSSOM or CODA. The processing of the data access operation is then complete.

OBJECT DIAGRAM DESCRIPTION OF POS_RF FUNCTIONING

The OOP Data Structure of POS_RF

Figure 6:
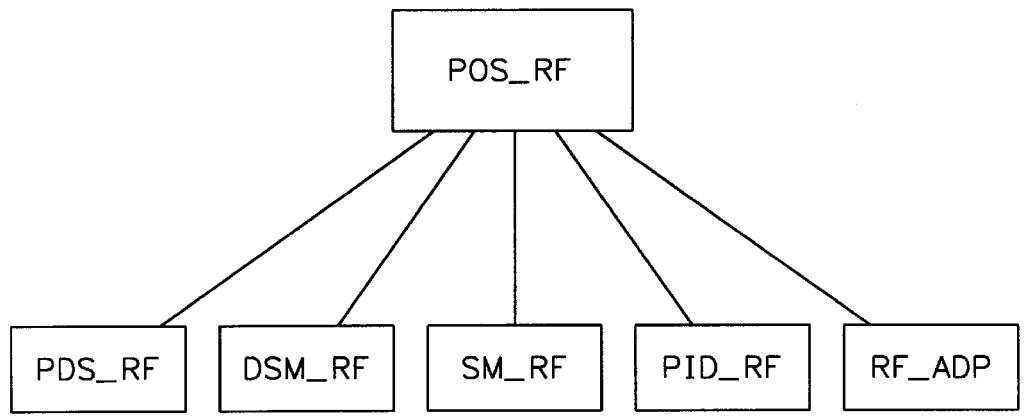
FIG. 6 is a top-level category diagram representation of the POS_RF framework of the computer processing system illustrated in FIG. 1.

FIG. 6 is a top-level category diagram representation of the POS_RF framework of the computer processing system illustrated in FIG. 1. There are many different ways to specify an object-oriented program design, as currently there is no universally accepted scheme of notation. The diagrams used herein will generally follow the model described in *Object-Oriented Analysis and Design with Applications,* 2d ed. (1994), by Grady Booch, available from The Benjamin/Cummins Publishing Company, Inc., Redwood City, Calif., USA. Use of Booch notation concepts within this specification should not be taken to imply any connection between the inventor and/or the assignee of this patent application and Mr. Booch, his employer, or his publisher. For a more general discussion of object-oriented notation, see *Object Oriented Methods,* 2d ed. (1994), by Ian Graham, available from Addison-Wesley Publishing Co., Inc., Reading, Mass., USA. Notational concepts used herein generally will be explained as needed.

A system that is modeled by an object-oriented framework can be represented at a high level of abstraction by a diagram called a top-level class diagram. FIG. 6 of the drawings is an example of a top-level class diagram containing boxes that represent abstractions of the POS_RF interface. The boxes are arranged in a hierarchy such that boxes representing abstractions close to the physical components of the system are at the lower levels of the diagram and boxes representing more abstract, functional components are closer to the top of the diagram. Thus, in FIG. 6 the higher level is represented by the POS_RF box, which represents the overall OOP system that interfaces to existing persistent object services. The components of the POS_RF system are represented by the remaining boxes, which are labelled PDS_RF, DSM_RF, SM_RF, PID_RF, and RF_ADP.

The boxes of FIG. 6 can be thought of as categories comprising groups of similar classes that are defined according to object-oriented programming concepts. Those skilled in the art will appreciate that the categories illustrated in FIG. 6 correspond to object-oriented programming objects that encapsulate data attributes and behaviors, and are stored in the memory illustrated in the block diagram of FIG. 1. Such objects can be implemented, for example, in a computer system operating environment that supports the C++ programming language.

Figure 7:
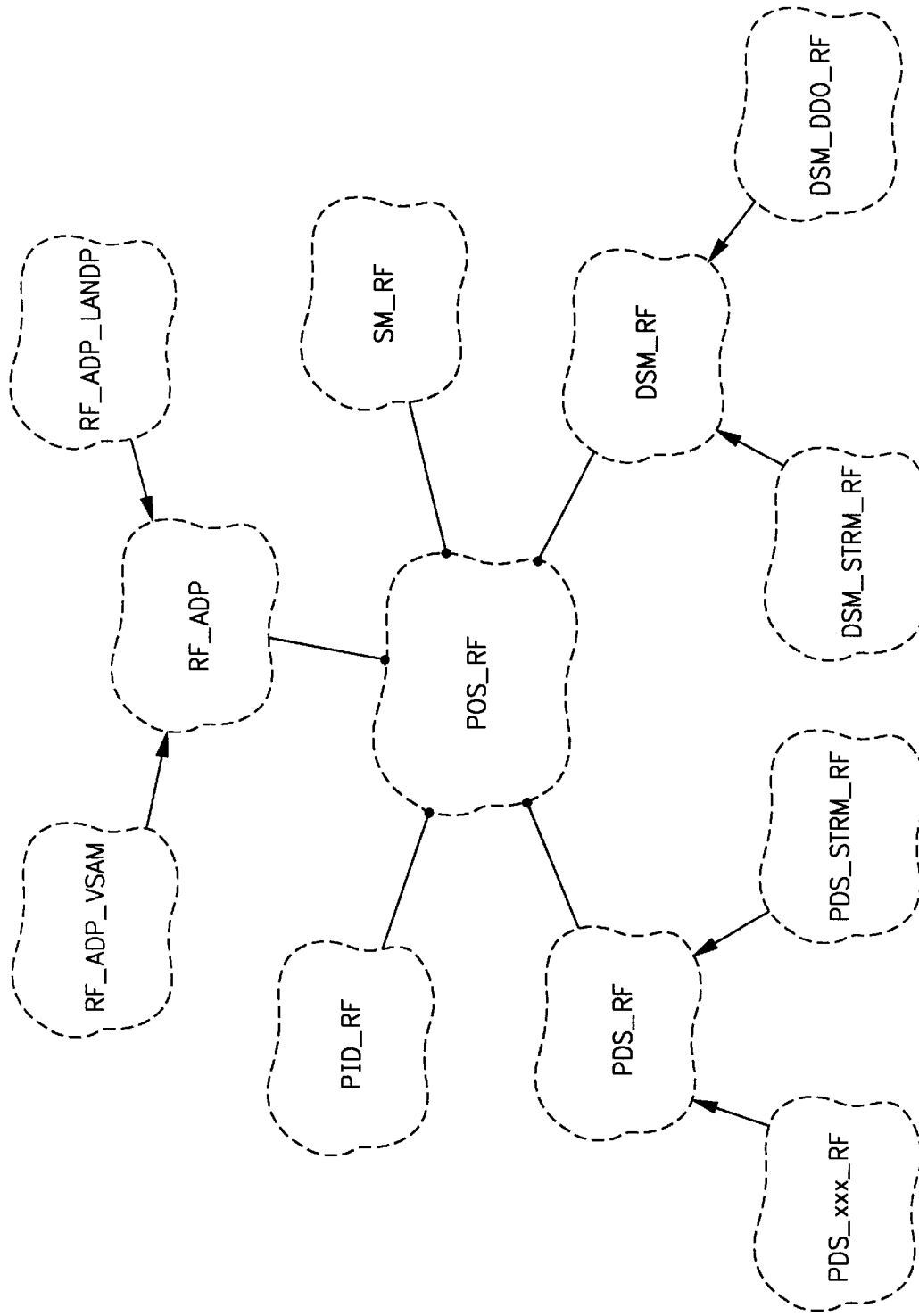
FIG. 7 is a class diagram representation of the POS_RF system showing the classes implemented by the computer processing system illustrated in FIG. 1.

The boxes in a top-level class diagram represent the system abstractions that provide the system behavior. The system abstractions also include classes and objects. Details of the system classes are provided in class diagrams (FIGS. 7–12) that show the class categories and indicate the relationships and responsibilities of the classes. In Booch notation, a class is represented by an irregularly shaped, dashed-line icon commonly referred to a cloud. FIG. 7, for example, shows several classes represented as clouds. Each class is identified by a name that is unique to the associated class category and also indicates the relationship of each class to one of the categories or mechanisms illustrated in FIG. 6.

Because the POS_RF framework is designed to interface with an existing persistent object (PO) service, it should be understood that additional objects will be defined by the existing PO service. For example, the preferred embodiment of POS_RF defines objects in accordance with the Persistent Object Framework (POF) and interfaces with both POSSOM and CODA. Accordingly, POS_RF must receive persistent object references represented by instances of a Persistent Object class. That is, a category diagram of the POF would include the category of Persistent Object, which represents the client object that is a persistent object whose underlying storage representation is a record file.

Returning to FIG. 6, the category boxes include one box labelled POS_RF, which is connected to boxes labelled PDS_RF, DSM_RF, SM_RF, PID_RF, and RF_ADP. In the extended framework the POS_RF category is represented by a single object instantiation of a POS_RF object that encapsulates the functioning of the POS_RF data access system. The POS_RF category is shown in FIG. 6 connected to the other categories with straight lines. Those skilled in the art will appreciate that such a connection indicates a simple "association" relationship between categories in which the connected objects share information. Thus, FIG. 6 indicates that the POS_RF object shares information with the PDS_RF, DSM_RF, SM_RF, PID_RF, and RF_ADP objects.

The POS_RF System Object Diagrams

Further details of the object relationships are provided in FIG. 7, which shows the relationships between the objects of each class. In particular, the POS_RF object is shown with an "aggregation" relationship to the various POS_RF objects. That is, the POS_RF system object (representing a particular POS_RF system extended from the POS_RF framework, with overrides and object extensions) is the whole, which is comprised of PDS_RF, DSM_RF, SM_RF, PID_RF, and RF_ADP object parts. FIG. 7 shows some exemplary extensions of the POS_RF object parts. For example, the DSM_RF object is shown with an inheritance relationship to two exemplary subclasses, DSM_STRM_RF and DSM_DDO_RF. Those skilled in the art will understand that an inheritance relationship indicates that objects in the DSM_STRM_RF and DSM_DDO_RF subclasses will have attributes and operations corresponding to the attributes and operations defined by the DSM_RF superclass. The DSM_STRM_RF class provides processing for streamable data types such as supported by the POSSOM system and the DSM_DDO_RF class provides protocol processing for data types supported by the CODA system.

FIG. 7 also shows two other inheritance relationships, the RF_ADP object has a superclass relationship with two inheritance subclasses RF_ADP_VSAM and RF_ADP_LANDP, and the PDS_RF object is shown with a superclass relationship to subclasses PDS_STRM_RF and PDS_xxx_RF. The RF_ADP_VSAM objects provide adapter processing to interface directly with VSAM-type datastore, and the RF_ADP_LANDP objects provide adapter processing to interface directly with LANDP-type datastore. The PDS_RF subclass objects provide processing that translates between the persistent object protocol and the underlying datastore. That is, they map persistent object references to the appropriate RF_ADP objects. The POS_RF object determines which PDS_RF subclass should process a particular client request and sends the request to the appropriate PDS_RF subclass, which receives the request and correctly processes the protocol before passing the request on to the appropriate RF_ADP object.

In FIG. 7, the PDS_STRM_RF subclass represents processing for streamable data and the subclass PDS_xxx_RF represents an object that processes another, unspecified "xx" protocol type. Particular subclass objects will be provided by the framework user depending on the intended application and persistent objects to be serviced. Those skilled in the art will be able to provide the subclasses with operations necessary for the intended application, in view of this description, without further description.

The PDS_RF Class

FIG. 8 shows the PDS_RF object cloud in further detail, illustrating the method or operation names of the PDS_RF class. The words "method" and "operation" will be used interchangeably to refer to the processing steps performed by an object of the corresponding class diagram. The Persistent Object Framework with which POS_RF interfaces includes a Persistent Object Manager (POM). The PDS_RF object provides a uniform interface to the POM by calling the DSM_RF object. The POS specification describes five persistent operations, not described herein, implemented by the PDS_RF object, which is derived from an abstract class of the POS called PDS. That is, the PDS_RF object has attributes and operations defined generally by the PDS class of the POF, but is further specialized by defining the protocol supported by the persistent object and datastore manager. As noted above, these specializations are generally referred to as PDS_xxx_RF. It should be understood that each specialized PDS_xxx_RF object will necessitate a corresponding specialized DSM_xxx_RF object.

The method titles shown in the object diagrams will be listed in accordance with accepted Booch notation, in which method names are shown as a string of uppercase initial words followed by paired parentheses, with the first letter of the initial word in lowercase. Thus, with reference to the methods illustrated in FIG. 8, the processing of the method called checkObjectType() checks to determine if an object is of the correct type for the corresponding PDS_xxx_RF object. The connect() method is intended as a pass-through to the restore() operation, in recognition that there is currently no clear consensus in the persistent object service community as to the processing implemented by a connect method. The disconnect() method is, in a manner analogous to the connect method, not presently defined and is intended as a pass-through to the store method.

Continuing with the methods shown in FIG. 8, the store() method must be overridden in the framework extension and is implemented in POS_RF by calling the addObject() or updateObject() method of the DSM_RF class, based on an indicator in the PID of the persistent object. The restore() method must be overridden by the specialized PDS_xxx_RF objects and is implemented by calling the retrieveObject() method of the corresponding DSM_RF class. The delete() method is implemented in POS_RF by calling the deleteObject() method of the DSM_RF class.

The somInit() and somUnInit() methods shown in FIG. 8 are examples of specialized methods included in the PDS_xxx_RF objects for initializing and disconnecting, respectively, datastore manager attributes called connectTab, nConnects, and dsm, as specified by the PDS class definition from which PDS_RF is derived for the preferred embodiment. Those skilled in the art will appreciate that, depending on the existing persistent object service system with which the POS_RF framework invention interfaces, the specialized methods of PDS_xxx_RF will change or will be different from those shown and described herein.

The DSM_RF Class

FIG. 9 shows the methods associated with the DSM_RF class objects. The DSM_RF class is derived as a subclass of the DSM class defined by the CODA system, the second of the two existing persistent object service systems with which the POS_RF framework is intended to interface. Those skilled in the art will appreciate that the particular classes and methods of the DSM_RF objects might differ if the CODA system is not one of the systems with which POS_RF interfaces. In the preferred embodiment, the DSM_RF class implements only the operations of the DSM class from CODA that are needed to permit PDS_RF to properly carry out its functions. In particular, the DSM_RF supports two types of operations. One type of operation is protocol independent, comprising operations such as connect() and disconnects. These operations are datastore (record file) based and need not be overridden by the subclass extension. The other type of operation is protocol dependent, comprising operations such as addObject() and deleteObject(). These operations are object-based and must be overridden by the specialized DSM_xxx_RF object extension of the framework, as the process for getting data into and out of an object depends on the protocol used by the object.

In processing, the DSM_RF object calls the RF_ADP object to implement operations. That is, an RF_ADP object will be created for a particular DSM_RF and constitutes a record file wrapper to interface underlying file systems to the persistent objects of the client system. The RF_ADP object operation is protocol independent. The DSM_RF operation always translates object data into a record buffer based on the protocol for which it is specialized. The protocol-independent RF_ADP operations are called to perform the data access operations on data in record file storage.

In FIG. 9, the connect() operation is equivalent to an open file or create file process. The input parameter to the operation is PID_RF. The DSM_RF object looks for a datastoreName attribute in the PID_RF object and uses the name to open the file. If the file does not exist, then the DSM_RF object will get the schema mapper from the PID_RF and use the file specification defined in the schema mapper to create the file. After the file is open, the DSM_RF assigns the file handle as the value of the attribute connectID to the PID_RF object. Generally, an error flag is indicated if the DSM_RF object fails to open or create the file. The disconnect() operation uses a connectID attribute in the input PID_RF object to close a record file. The addObject() operation inserts a record into a file and is overridden by the specialized DSM_xxx_RF object extension for the particular file type. Similarly, the deleteObject() operation deletes a record from a file and is overridden by the specialized DSM_xxx_RF object.

The updateObject() method indicated in FIG. 9 updates the record in a file to the input object value, for storage into record datastore, and is overridden by the specialized DSM_xxx_RF. The retrieveObject() method reads a record, for reading a file from record datastore, and is overridden by the specialized DSM_xxx_RF. The obj2Rec() method performs the transfer of object data into a record and must be overridden by the specialized DSM_xxx_RF. In an analogous fashion, the rec2Obj() method performs the transfer of record data to the attribute values of a persistent object in the client application and must be overridden by the specialized DSM_xxx_RF. The getSchemaMapper() method retrieves the name of the schema mapper from the PID information and then causes the instantiation of the schema mapper for use. The findRFAdp() method causes an instance of the RF_ADP class in accordance with an environmental variable POS_RF_ADP.

As noted above, specialized DSM_xxx_RF objects will be defined for processing of desired data types. The DSM_STRM_RF shown in FIG. 7 is a specialization of the DSM_RF class shown in FIG. 9 and performs processing of streammable data. In particular, a DSM_STRM_RF object translates between object data and a record data buffer by calling the obj2Rec() and rec2Obj() methods of the DSM_RF. As object data is translated into a record buffer, the RF_ADP object is called to perform the necessary record operations. In DSM_STRM_RF, the addObject() method translates object data into a record format by calling the obj2Rec() method, then calls RF_ADP to insert the translated record data into the file based on the definition in the corresponding PID_RF object. The deleteObject() method in the specialized DSM_STRM_RF object calls the RF_ADP object to delete the record from the file based on the definition in the corresponding PID_RF object. The updateObject() method in the specialized DSM_STRM_RF object translates object data into a record file by calling the obj2Rec() method, then calls RF_ADP to update the record in the file based on the definition in the corresponding PID_RF object.

The retrieveObject() method of the DSM_STRM_RF object calls the RF_ADP object to read a record into a record buffer based on the definition in the corresponding PID_RF object, and then translates the record data into object attribute values for the corresponding persistent object by calling the rec2Obj() method. The obj2Rec() method places object data into a stream data structure by calling a writeToStream() operation of the DSM_STRM_RF object and then gets an appropriate schema mapper from the PID_RF. The obj2Rec() method then calls a strm2Rec() method defined in the schema mapper to place data from the stream data structure into the object. The rec2Obj() method gets the schema mapper from the PID_RF object and calls a rec2Strm() method defined in the schema mapper to place the record data into a stream data structure. The rec2Obj() method then calls a readFromStream() method defined in the DSM_STRM_RF object to place the data into the object.

Another specialized DSM_xxx_RF object is defined for the dynamic data object (DDO) protocol handled by the CODA system. In the preferred embodiment, the DSM_DDO_RF is derived from the DSM class of the OMG datastore manager specification that uses DDO as a protocol. That is, the DSM_DDO_RF is a subclass of the DSM class in the CODA system. To meet record access requirements for CODA, it is necessary to provide DSM_DDO_RF processing for the DDO protocol. In particular, the interface of DSM_DDO_RF is much like the DSM_STRM_RF interface except that the protocol is specified in accordance with the DDO specification. Those skilled in the art will be able to provide the necessary processing operation details, based on the description herein, without further explanation.

The SM_RF Class

Figure 10:
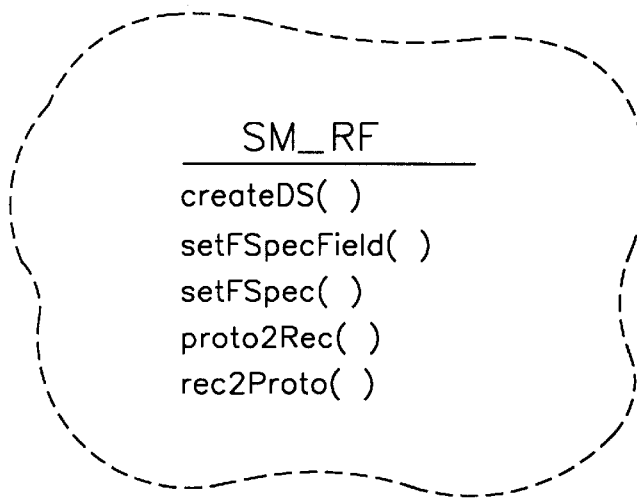
FIG. 10 is a class diagram representation of the SM_RF category implemented by the computer processing system illustrated in FIG. 1, showing the method names.

FIG. 10 illustrates the operations associated with the SM_RF object of the POS_RF framework. The SM_RF object maps object attribute data into record data according to a predetermined record data format. That is, the developer who extends the POS_RF framework designs the SM_RF extension according to the record format to be supported. The SM_RF object class is necessary for object-to-record data mapping because most records will typically be either fixed-length or variable-length byte strings. Consequently, there is no information maintained in the record datastore that describes the record data format. The operations of the SM_RF object are called createDS(), setfSpecField(), setfSpec(), proto2Rec(), and rec2Proto().

The SM_RF object operations may be briefly described as follows. The setfSpec() operation is not overridden by the framework user and provides specifications for the supported datastore. The setfSpecField() operation sets the record file field specification by passing parameters for the supported datastore, and is not overwritten by the framework user. The createDS() operation creates a new record datastore by calling the setfSpec() operation a sufficient number of times to fill a field specification array, in accordance with the setfSpecField() operation parameters. The proto2Rec() operation translates data in a protocol into the protocol supported by the POS_RF system and is overridden by the framework developer for specific protocols to be supported by the POS_RF extension. For example, when SM_RF is to support a stream protocol, the proto2Rec() operation allocates space in memory for a record data buffer, then repeatedly uses getSchemaMapper() methods of the DSM_STRM_RF object to retrieve the values of the attributes and store them into the record buffer, based on the record format specified. The rec2Proto() operation translates data from a record into a protocol. The rec2Proto() operation is overridden by the client for objects that support a specific protocol. For example, when used to support a stream protocol, the rec2Proto() operation first obtains the values of each record field by casting the record with a data structure, obtaining a new stream, and placing the record field data into the stream by using putStream() methods of the DSM_STRM_RF object. The interaction of these operations will next be described in greater detail.

The SM_RF object provides operations to create a new datastore by defining the specifications required to create a file. In the preferred embodiment, SM_RF also provides operations that map record data to and from the stream protocol. The mapping between record and stream data must be overridden by the object implementation class based on knowledge of the record format. When a persistent object of a client application invokes an operation, such as restore(), the PID_RF object information is passed to the PDS_RF object via the Persistent Object Manager of the persistent object service, such as POSSOM or CODA. The PDS_RF object implements the restore() operation by requesting the DSM_RF object to do a retrieveObject() operation. The DSM_RF object gets the persistent object as well as its PID_RF object. The DSM_RF has an operation called getSchemaMapper() that will get the name of the schema mapper object from the PID_RF object and instantiate an instance of the schema mapper.

The DSM_RF Class

The DSM_RF object also has two operations to transfer data between the object and the record, called obj2Rec() and rec2Obj(). The implementations of these two operations invoke the getSchemaMapper() operation and use the schema mapper operations proto2Rec() and rec2Proto(). To implement the retrieveObject() operation, the DSM_RF object invokes the getRec() operation of the RF_ADP object to obtain the record data and then invokes the rec2Obj() operation to place the data into the object via the rec2Proto() operation of the schema mapper object. If the DSM_RF object is unable to open the datastore file with the file name obtained as an attribute of the PID_RF object, then the DSM_RF object will invoke the getSchemaMapper() operation and use the createDS() operation to create a new record file. If the createDS() operation is not overridden by the client application, then an error flag will be generated.

The PID_RF Class

Figure 11:
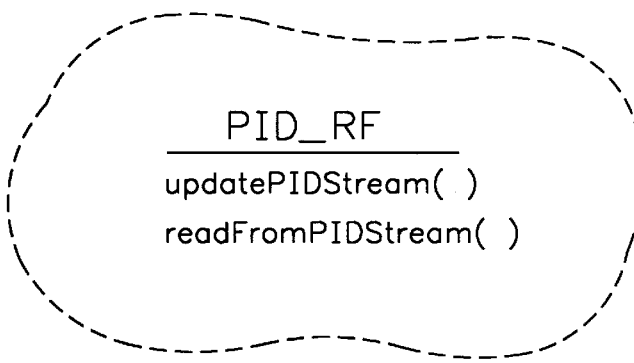
FIG. 11 is a class diagram representation of the PID_RF category implemented by the computer processing system illustrated in FIG. 1, showing the method names.

The PID_RF object operations listed in FIG. 11 are used for identifying the path of persistent object data from the client application. For the POS_RF system, any PID_RF object must satisfy two assumptions: (1) each persistent object has a unique identifier, and (2) the data of each persistent object is mapped to a record in datastore. The PID_RF object illustrated in FIG. 11 includes an operation called updatePIDStream() and an operation called readFromPIDStream(). Thus, a PID_RF object defines an access path from a persistent object of a client application to a record file in datastore. Because POS_RF is designed to interface with the POSSOM system, the PID_RF object is derived from the PID_DS object of the POSSOM system that identifies persistent data to be mapped to record datastore. Those skilled in the art will appreciate that the PID_RF object would be changed if the extended POS_RF framework were intended to interface with a different object-to-record data persistent object service system.

The PID_RF object includes an attribute of datastoreName, a full pathname of a datastore file. In the preferred embodiment, a boolean flag called datastoreNew is used to indicate when a new datastore type should be created. An attribute called connectID is a file handle for the datastore record file. A record identifier comprises an attribute called dataID. Finally, a parameter attribute called smMapper is the name of a schema mapper object.

The updatePIDStream() operation of the PID_RF object is overridden and places a PID attribute values into a PIDStream object. The readFromPIDStream() operation reads and assigns the values of attributes from the PIDStream object.

The RF_ADP Class

Figure 12:
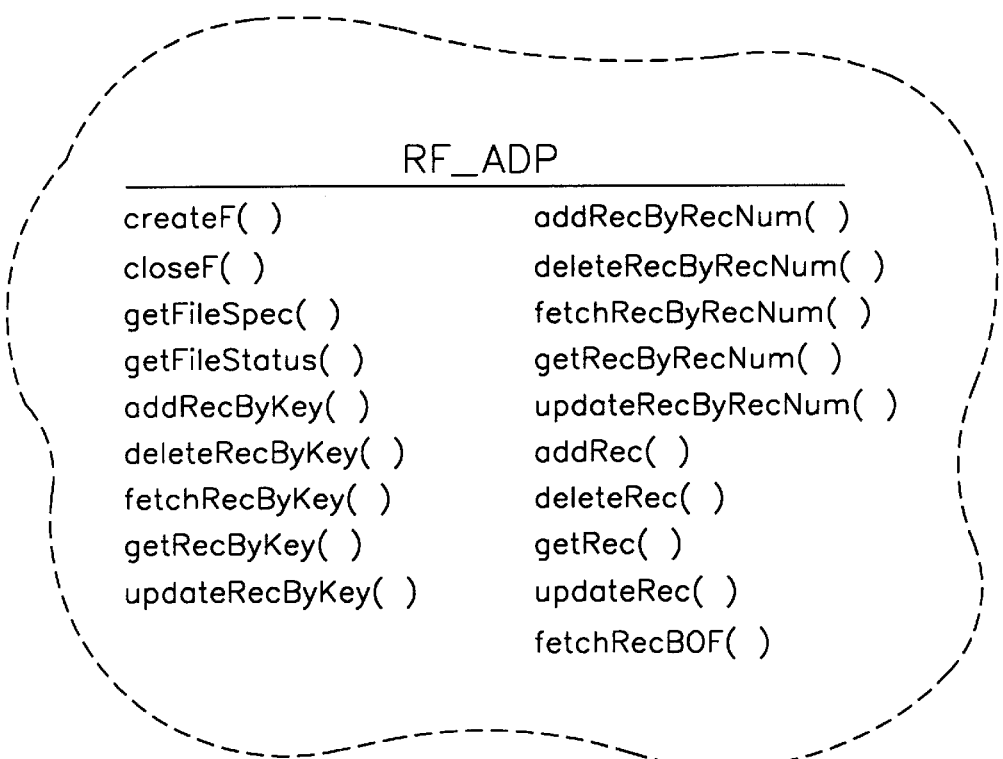
FIG. 12 is a class diagram representation of the RF_ADP category implemented by the computer processing system illustrated in FIG. 1, showing the method names.

FIG. 12 illustrates the operations of the RF_ADP object class. An RF_ADP object is the object wrapper that maps the DSM_RF object to the procedural record file system API. All operations of the RF_ADP object must be overridden by the derived class, so that the real implementation is implemented by the specialized adapter. With the definition of the RF_ADP, underlying record file systems can be plugged into the POS_RF system and, more precisely, the associated Persistent Object Service (POS) systems, without concern for design problems. The RF_ADP provides conventional record access operations based on file types. Most record file systems support multiple indexing operations. The design specification of PID_RF includes the attribute of indexName and also the attribute of isKey in the fileSpec to support the indexing operations. Additional operations can be provided in the RF_ADP object, as desired. The RF_ADP operations will next be described. Unless specified otherwise, the operations must be overridden by the specialized record file adapter object.

The openF() operation opens a record file in accordance with an input parameter specified by the PID_RF object and in accordance with the datastore to which the persistent object is being mapped. The datastoreName attribute must be set in the PID_RF object when the openF() operation is called. The output parameter is called connectID. The specialized adapter controls the access mode for the file open operation. In the preferred embodiment, if the underlying record file system supports file locking, then the file open is shared and a file lock condition will apply for data write operations. If the record file system does not have file locking, then what is known as an exclusive open is applied. The createF() operation creates a record file using the input parameter fileSpec. The closeF() operation closes a file and requires a connectID, also known as a file handle, to be passed as an input parameter.

The getFileSpec() operation retrieves a record file specification for a file, including the file type, record format, and the like. The file is identified by its file name. The getFileStatus() operation gets the status of an open file. The file status might be defined in an object-oriented language as follows in the Table 3 pseudo-code:

TABLE 3

```
interface POSRF_FileStatus {
    unsigned long numRecords;
    any createTime;
    any lastAccTime;
    ...;
}
```

The addRecByKey() operation inserts an object into the record datastore based on the key value received. The deleteRecByKey() operation deletes the corresponding record identified by the received input key value. The fetchRecByKey() operation positions the display cursor on the record identified by the received input key value. The getRecByKey() operation returns the record value as an object, based on the received input key value. A lock mode can be implemented to define locks, such as read locks and write locks, as desired. The updateRecByKey() operation replaces the record identified by the received input key with the input object value.

The addRecByRecNum() operation of the RF_ADP inserts an object into the record datastore based on a received record number. If the data slot in the file is occupied, then an error flag will be indicated. The deleteRecByRecNum() deletes the corresponding record identified by the input record number. The fetchRecByRecNum() operation positions the display cursor on the record identified by the input record number. The getRecByRecNum() operation reads the record identified by the input record number. A lock mode can be defined to provide read locks for shared data and write locks for exclusive data. The updateRecByRecNum() operation modifies the record identified by the received input record number. The addRec() operation inserts a record to the end of a record file. The deleteRec() operation deletes the record at which the current display cursor is pointed. The getRec() operation reads the record at which the current display cursor is pointed. The updateRec() updates the record at which the current display cursor is pointed, based on the input object value. The fetchRecBOF() operation places the display cursor at the beginning of the record file data.

As noted above, the RF_ADP_xxx objects will be defined for processing of desired datastore types. FIG. 7 shows two exemplary datastore type processing objects, one called RF_ADP_VSAM and another called RF_ADP_LANDP. The RF_ADP_VSAM is a specialization of the RF_ADP class using the "VSAM" record file system by IBM Corporation as the underlying record file system. In the implementation of POS_RF, the RF_ADP_VSAM might be packaged as a separate "vsam_adp.dll" class library, the details of which should be apparent to those skilled in the art without further explanation, in view of this discussion. Any other specialized RF_ADP object can be implemented similarly as a pluggable class library to be integrated into a "somprf" library. In the preferred embodiment, the operations of the RF_ADP_VSAM object provide the interface operations between RF_ADP and VSAM/x, a record oriented access method on the AIX/6000 system available from IBM Corporation. The operations necessary to provide the interface will be readily apparent to those skilled in the art, in view of this description, without further explanation. Similarly, the RF_ADP_LANDP is a specialization of the RF_ADP class for the "LANDP" record file system as the underlying datastore. Again, those skilled in the art will be able to produce the necessary operations without further explanation, in view of this description.

ADVANTAGES OF THE INVENTION

As described above, the present invention provides a framework for data access between multiple record-oriented data file systems and multiple object-oriented file systems across different protocol types. The framework thereby assists API program developers with the creation and maintenance of object-oriented application programs that can interface with record data files.

The present invention has been described above in terms of a presently preferred embodiment so that an understanding of the present invention can be conveyed. There are, however, many configurations for object-oriented data access frameworks not specifically described herein but with which the present invention is applicable. The present invention should therefore not be seen as limited to the particular embodiment described herein, but rather, it should be understood that the present invention has wide applicability with respect to data access frameworks generally. All modifications, variations, or equivalent arrangements that are within the scope of the attached claims should therefore be considered to be within the scope of the invention.

I claim:

1. A method of operating a computer system that provides an object-oriented programming environment, having one or more datastores that contain record-oriented data files, and communicating with one or more users executing object-oriented application programs for manipulation of persistent data objects corresponding to the data files, the method comprising the steps of:
   (a) receiving a request for manipulation of a persistent data object from one of at least two incompatible persistent object service systems utilizing different data protocols and class hierarchies;
   (b) associating each persistent data object with a data file by
      (1) associating each instance of a persistent data object with a persistent object identifier;
      (2) associating each instance of the persistent data object with only one data file in a datastore, such that each instance of an attribute of the data object is mapped to one associated data file, and
      (3) defining within each persistent object identifier a data identifier that is associated with either a record number or a key within the data file associated with the persistent object identifier; and
   (c) instructing the datastore to alter the information within a selected data file through the associated instance of the persistent data object.

2. A method as defined in claim 1, wherein the step of instructing the datastore to alter a data file comprises communicating with the datastore through an adapter object that is adapted for the record format of the datastore.

3. A method as defined in claim 2, wherein the step of instructing the datastore further comprises selecting the adapter object from among a predetermined set of adapter objects, each of which is adapted for a different record format.

4. A method as defined in claim 3, wherein the adapter object is selected by a schema mapper object.

5. A method as defined in claim 1, wherein the persistent object identifier designates the data protocol to be used.

6. A method as defined in claim 1, wherein the step of receiving a request comprises receiving a request from a first one of the persistent object service systems at a first data object and receiving a request from a second one of the persistent object service systems at a second data object.

7. A method as defined in claim 6, wherein the first data object comprises a persistent data service object and the second data object comprises a datastore manager object.

8. A computer system comprising:
a central processing unit;
a user interface;
one or more datastores that contain record-oriented data files; and
a main memory having an operating system that provides an object-oriented programming environment containing a framework that maintains a Persistent Object Service object that receives requests for manipulation of a persistent data object corresponding to the data files from one of at least two incompatible persistent object service systems utilizing different data protocols and class hierarchies, such that the Persistent Object Service object satisfies the request by performing steps comprising:
 (a) associating each persistent data object with a data file by
  (1) associating each instance of a persistent data object with a Persistent Identifier object,
  (2) associating each instance of the persistent data object with only one data file in a datastore, such that each instance of an attribute of the persistent data object is mapped to one associated data file, and
  (3) defining within each Persistent Identifier object a data identifier that is associated with either a record number or a key within the data file associated with the Persistent Identifier object; and
 (b) instructing the datastore to alter the information within a selected data file through the associated instance of the persistent data object.

9. A computer system as defined in claim 8, wherein the step of instructing the datastore to alter a data file comprises communicating with the datastore through a framework Adapter object that is adapted for the record format of the datastore.

10. A computer system as defined in claim 9, wherein the step of instructing the datastore further comprises selecting the Adapter object from among a predetermined set of framework Adapter objects, each of which is adapted for a different record format.

11. A computer system as defined in claim 10, wherein the Adapter object is selected by a framework Schema Mapper object.

12. A computer system as defined in claim 8, wherein the Persistent Identifier object designates the data protocol to be used.

13. A computer system as defined in claim 8, wherein the step of receiving a request comprises receiving a request from a first one of the persistent object service systems at a first framework data object and receiving a request from a second one of the persistent object service systems at a second framework data object.

14. A computer system as defined in claim 13, wherein the first data object comprises a framework Persistent Data Service object and the second data object comprises a framework DataStore Manager object.

15. A program product for use in a computer system having an object-oriented programming environment, the program product comprising:

(a) a signal bearing media; and
(b) a sequence of instructions on the signal bearing media that are executable by the computer system, the sequence providing an object-oriented application program that instantiates objects needed for execution of the application program such that the computer system performs the steps of:
 (1) generating a Persistent Identification object that is adapted to identify an access path to a particular record data file contained within a datastore in accordance with a datastore name, a data file identifier, and a schema mapper;
 (2) generating a Persistent Data Service object that performs Level 2 data access operations with a client process by interfacing with a POSSOM persistent object service system and a DataStore Manager object and is adapted to interface with record data files;
 (3) generating the DataStore Manager object to which the Persistent Data Service object interfaces such that the generated DataStore Manager object provides Level 3 data access operations and is adapted to interface with a CODA persistent object service system and with record data files;
 (4) generating a Schema Mapper object that receives a mapping indicator that specifies the manner in which the Persistent Identification object is to be mapped to the associated record, and
 (5) generating a Record File Adapter object that provides a mapping between the DataStore Manager object and a datastore procedure adapted for a predetermined type of datastore.

16. A program product as defined in claim 15, wherein the signal bearing media comprises recordable media.

17. A program product as defined in claim 15, wherein the signal bearing media comprises transmission media.

18. A computer system that provides access to record files in datastore from an object oriented user interface, the computer system providing an object-oriented programming environment having a framework that includes:
a Persistent Data Service object that receives Level 2 data access requests from the user interface for data access operations on persistent data objects associated with record files and generates datastore operations on the associated record files; and
a DataStore Manager that receives Level 2 and Level 3 data access requests directly from the user interface and Level 2 data access requests from the Persistent Data Service object, such that the DataStore Manager provides direct access to a Record File Adapter object adapted to communicate with a predetermined record file system.

19. A computer system as defined in claim 18, wherein the framework further includes a Persistent Object Service object that causes the computer system to perform the steps of:
(a) associating each persistent data object with a data file by
 (1) associating each instance of a persistent data object with a persistent object identifier,
 (2) associating each instance of the persistent data object with only one data file in datastore, such that each instance of an attribute of the data object is mapped to one associated data file, and
 (3) defining within each persistent object identifier a data identifier that is associated with either a record number or a key within the data file associated with the persistent object identifier; and (b) instructing the datastore to alter the information within a selected data file through the associated instance of the persistent data object.

20. A computer system as defined in claim 19, wherein the step of instructing the datastore to alter a data file comprises communicating with the datastore through a Record File Adapter object that is adapted for the record format of the datastore.

21. A computer system as defined in claim 20, wherein the step of instructing the datastore further comprises selecting the Record File Adapter object from among a predetermined set of objects, each of which is adapted for a different record format.

22. A computer system as defined in claim 21, wherein the Record File Adapter object is selected by a Schema Mapper object.

23. A computer system as defined in claim 19, wherein the persistent object systems utilize different data protocols.

24. A computer system as defined in claim 23, wherein the persistent object identifier designates the data protocol to be used.

25. A computer system as defined in claim 19, wherein the step of receiving a request comprises receiving a request from a first one of the persistent object service systems at a first data object and receiving a request from a second one of the persistent object service systems at a second data object.

26. A computer system as defined in claim 25, wherein the first data object comprises the Persistent Data Service object and the second data object comprises the DataStore Manager object.

* * * * *